United States Patent [19]
Dominiak et al.

[11] Patent Number: 5,779,504
[45] Date of Patent: Jul. 14, 1998

[54] MODULAR TERMINAL BLOCK ASSEMBLY

[75] Inventors: Robert M. Dominiak, Chicago;
Kenneth C. Littlejohn, Northlake;
Richard T. Kaczmarek, Park Ridge;
Janet A. Bradshaw, Darien, all of Ill.;
Wayne G. Haines, Toccoa, Ga.;
Michael J. Bascom, Clinton Township, Mich.

[73] Assignee: Reltec Corporation, Mayfield Heights, Ohio

[21] Appl. No.: 536,062

[22] Filed: Sep. 29, 1995

[51] Int. Cl.⁶ ............................................. H01R 9/22
[52] U.S. Cl. ................................. 439/709; 439/532
[58] Field of Search ................................. 439/395–405, 439/701, 709–715, 721, 723–725, 620, 922, 532

[56] References Cited

U.S. PATENT DOCUMENTS

| | | |
|---|---|---|
| 4,127,312 | 11/1978 | Fleischhacker et al. . |
| 4,634,209 | 1/1987 | Forberg et al. . |
| 4,652,070 | 3/1987 | Suffi . |
| 4,729,064 | 3/1988 | Singer, Jr. . |
| 4,846,735 | 7/1989 | Teichler et al. . |
| 5,000,703 | 3/1991 | Biederstedt et al. . |
| 5,086,368 | 2/1992 | Gerke et al. . |
| 5,114,356 | 5/1992 | Taybl et al. . |
| 5,147,218 | 9/1992 | Matthews et al. . |
| 5,178,558 | 1/1993 | Knox et al. . |
| 5,302,137 | 4/1994 | Suffi . |
| 5,314,350 | 5/1994 | Matthews et al. . |
| 5,451,170 | 9/1995 | Suffi . |

FOREIGN PATENT DOCUMENTS

| | | |
|---|---|---|
| 2662042 | 5/1990 | France . |

OTHER PUBLICATIONS

Krone, 25–Pair Module, product literature, 6 pages, printing date of Jan. 1993.

Krone, System Ordering Guide, product literature, 8 pages, date of Aug. 1992 noted.

ADC Telecommunications, product literature sheets, 16 pages, copyright 1993.

Carpano Et Pons, general product literature, 6 pages, printing date of Jan. 1986.

Carpano Et Pons, Connecting Systems Instructions, 4 pages, printing date of Feb. 1987.

Quante, Connection Block Evs 85, product literature, 11 pages, Sep. 1988.

*Primary Examiner*—Khiem Nguyen
*Attorney, Agent, or Firm*—Trexler, Bushnell, Giangiorgi & Blackstone, Ltd.

[57] ABSTRACT

The invention is a modular terminal block assembly. The modular terminal block assembly includes a base module in which communications company lines may be dressed and retained during the dressing operation. A connector module is provided for attachment over the base module and to engage the distribution lines retained in the base module with insulation displacement connectors (IDC) which are retained in the connector module. A protection module is provided for engagement with an opposite side of the base module so that protection can be provided on the lines without interfering with the connection termination of customer service line on the connector module. The modular terminal block assembly provides structures which allow the assembled modular terminal block to be retained on a standard U-shaped mounting frame or for attachment to a rod frame system. The protection module maintains protection on the lines while the terminal block assembly is in contact with the U-shaped frame and rod frame system. A half-tap assembly may be attached to the modular terminal block, independent of the service line assembly for the addition of a line to the terminal block. An environmental protectant is retained in the modular terminal block to protect the conductive connections retained therein from detrimental environmental effects.

26 Claims, 11 Drawing Sheets

MODULAR TERMINAL BLOCK ASSEMBLY

BACKGROUND

The present invention relates to a communication connector terminal block assembly system and more particularly to modular terminal block assemblies for termination of distribution lines and interconnection with service lines.

A variety of communication line connector terminal block assemblies are available to terminate and interconnect communication company distribution lines with customer service lines. While some of these terminal blocks provide adequate termination and interconnection, all of the terminal blocks encounter some form of problem which degrade the efficiency, integrity or other characteristics of the system.

For example, there are two primary equipment mounting systems which are widely used throughout the world. Many systems employ a U-shaped frame for mounting multiple terminal blocks. The U-shaped frame with the multiple terminal blocks attached thereto can then be attached to a cabinet or large multi-unit frame. There are advantages to the U-shaped frame assembly not to mention acceptance and application in many interconnection systems.

A second type of equipment mounting frame system is a rod system. The rod system employs two parallel rods which are spaced apart a predetermined distance so that terminal blocks may be attached thereto. One advantage of the rod system over the U-shaped frame system is that the terminal blocks may be closely spaced or positioned abutting one another allowing denser packing and greater space efficiency. The terminal blocks are typically attached to the rod to allow a terminal block to be retained on one rod and disengageable from the other rod to allow pivotal access to both sides of the terminal block.

While terminal blocks may be available for mounting to either the U-shaped frame or the rod assembly, many terminal blocks cannot be used with both equipment mounting systems. As such, there is a need for a terminal block which can be used with either the U-shaped frame mounting system or the rod structure mounting system.

Another problem encountered with available terminal blocks is that they are typically designed for either internal use or external use. Most terminal blocks are designed for internal use. An enclosure or other environmental protection structure is provided around the terminal block. This is common when the terminal blocks are mounted within a building or other facility which provides protection from harsh environmental effects. However, even when terminal blocks are installed indoors or in other protected setting, the components of the terminal block still may be exposed to detrimental environmental effects. For example, dust, moisture, and airborne particulates are attracted to, accumulate on, and create a film on the exposed conductive components. The moisture, particulates and film cause detrimental microscopic corrosion on the conductive components and degrade the operation of the assembly. As such, even in internal uses, it may be desirable to provide environmental protection of the terminal blocks.

Other terminal blocks are designed for external use. The external terminal block, however, are typically designed as a separate assembly from the internal terminal blocks. It would be desirable to provide a single terminal block assembly system which can be used internally or externally in order to exploit efficiencies which would be inherent in such a universal design. For example, cost efficiencies may be exploited since one type of terminal block assembly system is produced for internal and external uses. There are skill efficiencies which result from the tradesperson having to be familiar with only one type of structure. The skill efficiencies translate into installation reliability since fewer installation errors will be encountered. Further, replacement parts and expansion requirements can be more quickly accommodated since inventories of only one type of terminal block assembly system need to be maintained.

Still a further problem encountered by prior art terminal blocks is that they do not provide constant line protection. Some prior art terminal blocks provide line protection but the line protection devices are attached to the customer service connection portion of the terminal block. This is a problem because the protection must be removed in order to access the customer service line. When the protection device is removed, the personnel working on the system and the equipment connected to the system are not protected. It is important to provide constant line protection for both personnel and equipment.

Additionally, some available terminal blocks do not provide line isolation for two-way testing. When there is a line failure, it is important to be able to isolate the customer service line from the distribution line to permit tracing of the line problem. Because prior art terminal blocks do not provide line isolation, it is very difficult to trace and identify line fault problems. As such, it would be highly desirable to provide line isolation and testing capabilities in a terminal block assembly system.

Most terminal blocks do not provide the ability to selectively attach half-tap assemblies. While some terminal blocks may provide half-tap assemblies, the block must be specifically ordered with this feature. Such a specialized terminal block increases inefficiencies associated with the system and therefore is undesirable. It would be desirable to provide a terminal block assembly system in which half-tap assemblies may be selectively added as needed for specific lines.

OBJECTS AND SUMMARY

A general object of the claimed invention is to provide a modular terminal block assembly which includes several modules for the termination of distribution lines and service lines.

Another object satisfied by the claimed invention is to provide a modular terminal block assembly which can be used in an internal or external environment such that in the external environment, the assembly can provide environmental protection.

Still another object satisfied by the claimed invention is to provide a modular terminal block assembly to which a protection module may be attached and which protection module provides constant line protection.

Yet a further object satisfied by the claimed invention is to provide a modular terminal block assembly to which a half-tap assembly may be added.

Still a further object satisfied by the claimed invention is to provide a modular terminal block assembly which provides line isolation and test port capabilities associated with each side of the interconnected line when the line connectors are isolated.

Briefly, and in accordance with the foregoing, the present invention envisions a modular terminal block assembly. The modular terminal block assembly includes a base module in which communications company lines may be dressed and retained during the dressing operation. A connector module is provided for attachment over the base module and to engage the distribution lines retained in the base module with insulation displacement connectors (IDC) which are retained in the connector module. A protection module is provided for engagement with an opposite side of the base module so that protection can be provided on the lines without interfering with the connection termination of customer service line on the connector module. The modular terminal block assembly provides structures which allow the assembled modular terminal block to be retained on a standard U-shaped mounting frame or for attachment to a rod frame system. The protection module maintains protection on the lines while the terminal block assembly is in contact with the U-shaped frame and rod frame system. A half-tap assembly may be attached to the modular terminal block, independent of the service line assembly for the addition of a line to the terminal block. An environmental protectant is retained in the modular terminal block to protect the conductive connections retained therein from detrimental environmental effects.

BRIEF DESCRIPTION OF THE DRAWINGS

The organization and manner of the structure and function of the invention, together with further objects and advantages thereof, may be understood by reference to the following description taken in connection with the accompanying drawings, wherein like reference numerals identify like elements, and in which.

DESCRIPTION

While the present invention may be susceptible to embodiment in different forms, there is shown in the drawings, and herein will be described in detail, an embodiment with the understanding that the present description is to be considered an exemplification of the principles of the invention and is not intended to limit the invention to that as illustrated and described herein.

Figure 1:
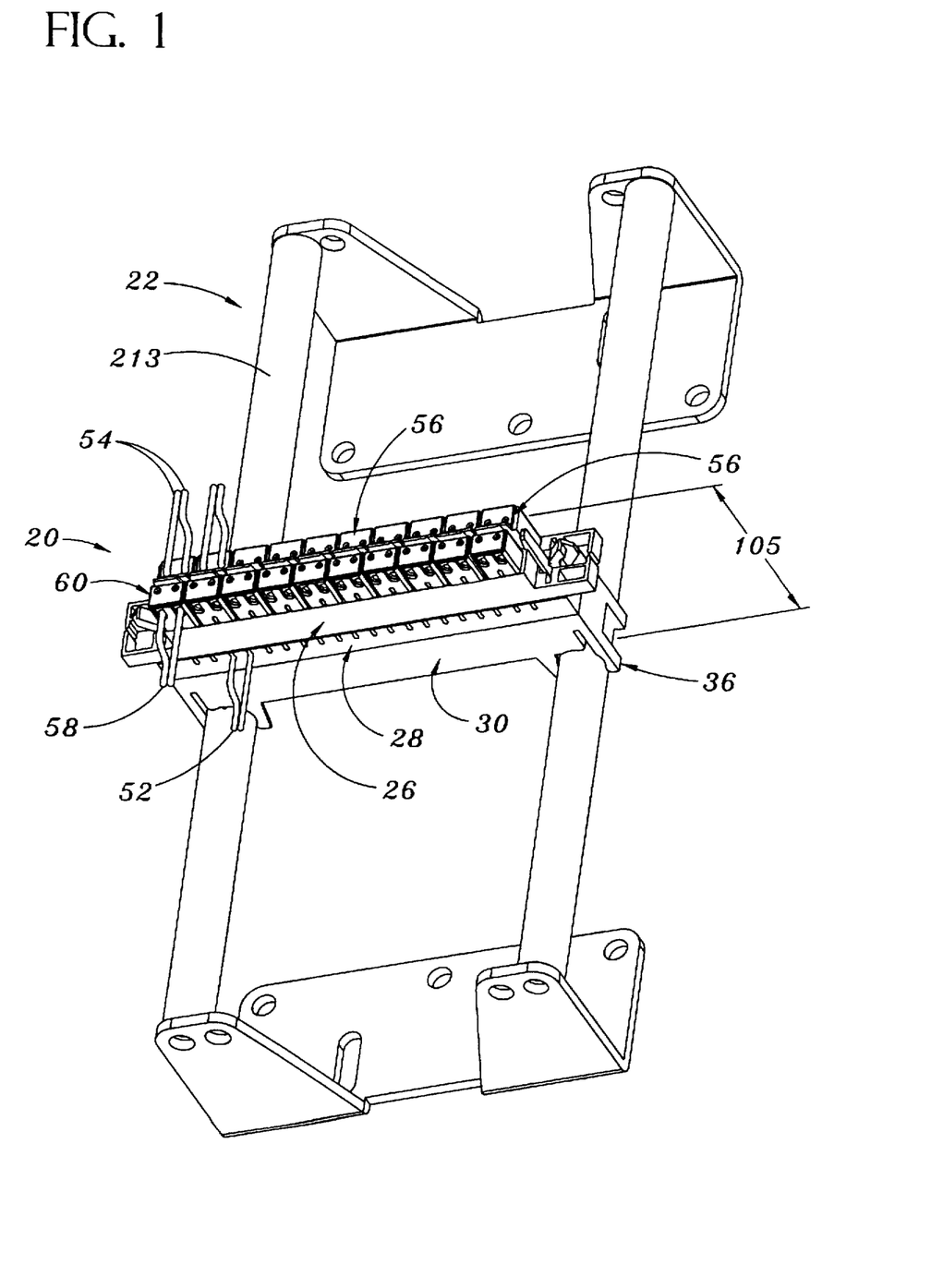
FIG. 1 is a perspective view of a modular terminal block assembly of the present invention attached to a rod mounting frame, showing customer service lines and telephone company distribution lines attached to the modular assembly.
Figure 2:
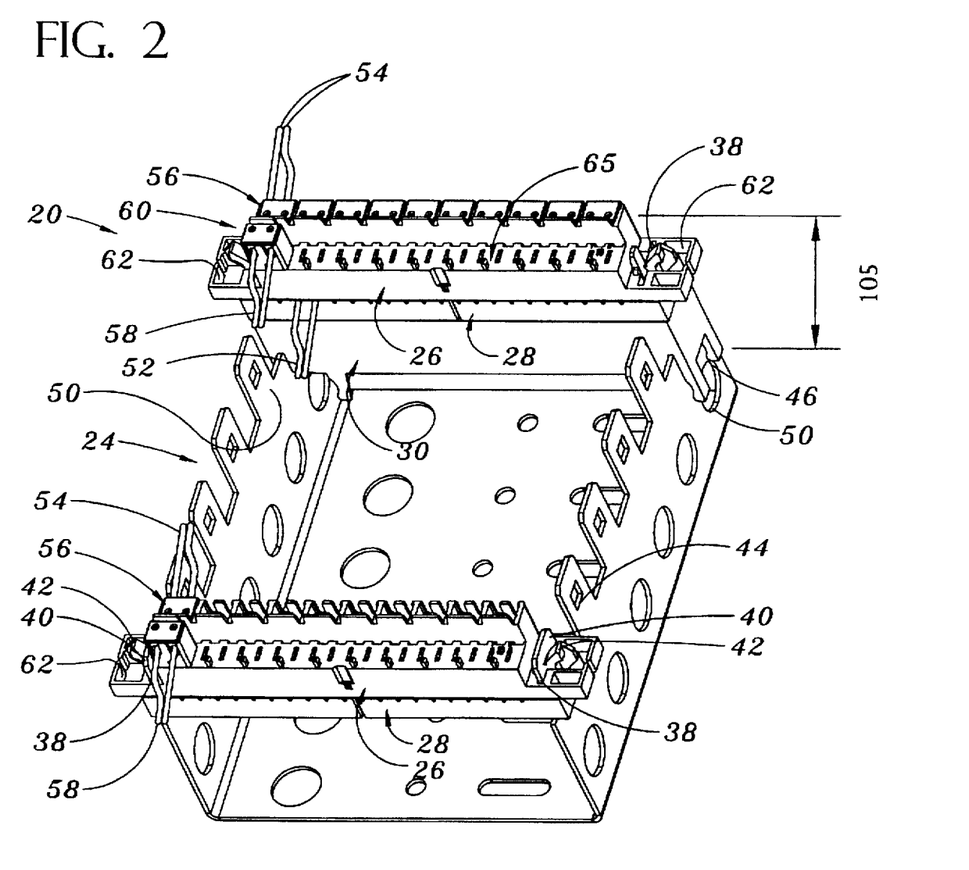
FIG. 2 is a perspective view of the modular terminal block assembly of the present invention as shown in FIG. 1 and in which the modular assembly is attached to a U-shaped frame member for mounting to a rack assembly.
Figure 3:
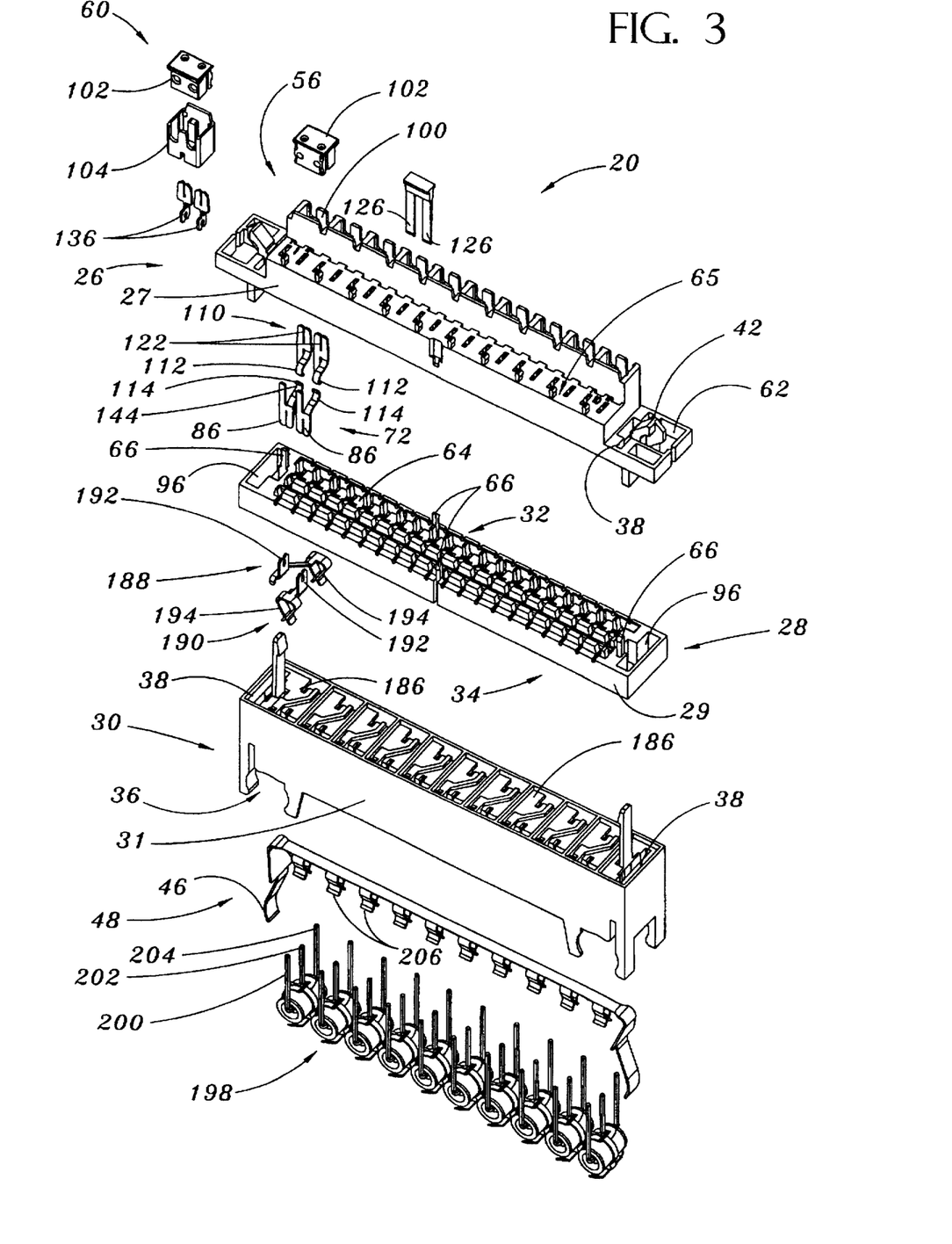
FIG. 3 is an exploded, perspective view of the modular terminal block assembly showing a connector module exploded from the first side of a base module and a protection module exploded from a second side of the base module with connectors and components detached from these modules.

With reference to FIGS. 1, 2, and 3, is modular terminal block assembly 20 is shown mounted to a rod frame structure 22 (see FIG. 1) and to a U-shaped frame 24 (see FIG. 2). With further reference to FIG. 3, the terminal block assembly 20 has been exploded to show the various modules and components associated with each module. More particularly, with reference to FIG. 3, there is shown a connector module 26 having a connector module housing 27, a base module 28 having a base module housing 29, and a protection module 30 having a protection module housing 31. The base module 28 has a first side 32 and a second side 34. The connector module 26 attaches to the first side 32 of the base module 28 and the protection module 30 attaches to the second side 34 of the base module 28. When the modules 26, 28, 30 are assembled to form the terminal block assembly 20 as shown in FIGS. I and 2, the terminal block assembly 20 can be attached to the rod frame system 22 or to the U-shaped frame 24 without using any additional mounting components as required with some prior art devices.

As shown in FIGS. 1 and 2, rod-mounting structures 36 are provided on the protection module 30 for attaching the assembly 20 to a rod frame mounting system 22. The present invention also provides frame mounting structures 38 which in the form of apertures 38 formed through each of the modules 26, 28, 30 at opposed ends of the modules. Additionally, with regard to the U-shaped frame 24, the assembly may be used with or without the protection module 30. If the assembly is used without the protection module 30 (see the lower portion of FIG. 2) mounting flanges 40 of the U-shaped frame 24 are inserted through the frame mounting apertures 38 with a biased locking finger 42 engaging an opening 44 in the flange 40. When the module 20 is attached to the U-shaped frame 24 with the protector module 30 in place, the flange 40 is inserted into the frame mounting apertures 38. A biased portion 46 of a grounding bar structure 48 retained in the protection module 30 is biased into conductive contact against an inside surface 50 of the U-shaped frame 24.

As shown in the illustrations, distribution lines 52 are retained between the connector module 26 and the base module 28 and service lines 54 are connected to a service connection assembly 56 on the connector module 26. A second set of service lines 58 may also be attached to a half-tap assembly 60 on the connector module 26. Although the lines 52, 54, 58 are shown in partial perspective view, these lines 52, 54, 58 may be groomed or retained in grooming rings 62 on either side of the connector module 26. The lines 52, 54, 58 may also be groomed rearwardly behind the module 20 in accordance with standard line dressing practices.

Having now briefly reviewed the overall structure and function of the present invention 20, we now turn to the illustrations in order to more specifically describe the structures and functions of the components of the invention. More particularly, with reference to FIGS. 3–5, the base module 28 is more fully described. As shown in FIG. 3, the first side 32 of the base module 28 includes a plurality of wire dressing structures 64. These wire dressing structures 64 are arranged to be associated and paired with a corresponding service connection assembly 56 of the connector module 26. In this regard, when the connector module 26 is attached to the base module 28, each pair of lines or wire dressing structures 64 will be placed in connection with a corresponding service connection assembly 56. This also positions the pairs of wire dressing structures 64 for connection with corresponding half-tap assemblies 60 which may be attached to corresponding half-tap areas 65. Locking fingers 66 on the base module 28 engage and retain the connector module 26 in connection with the base module 28.

Figure 4:
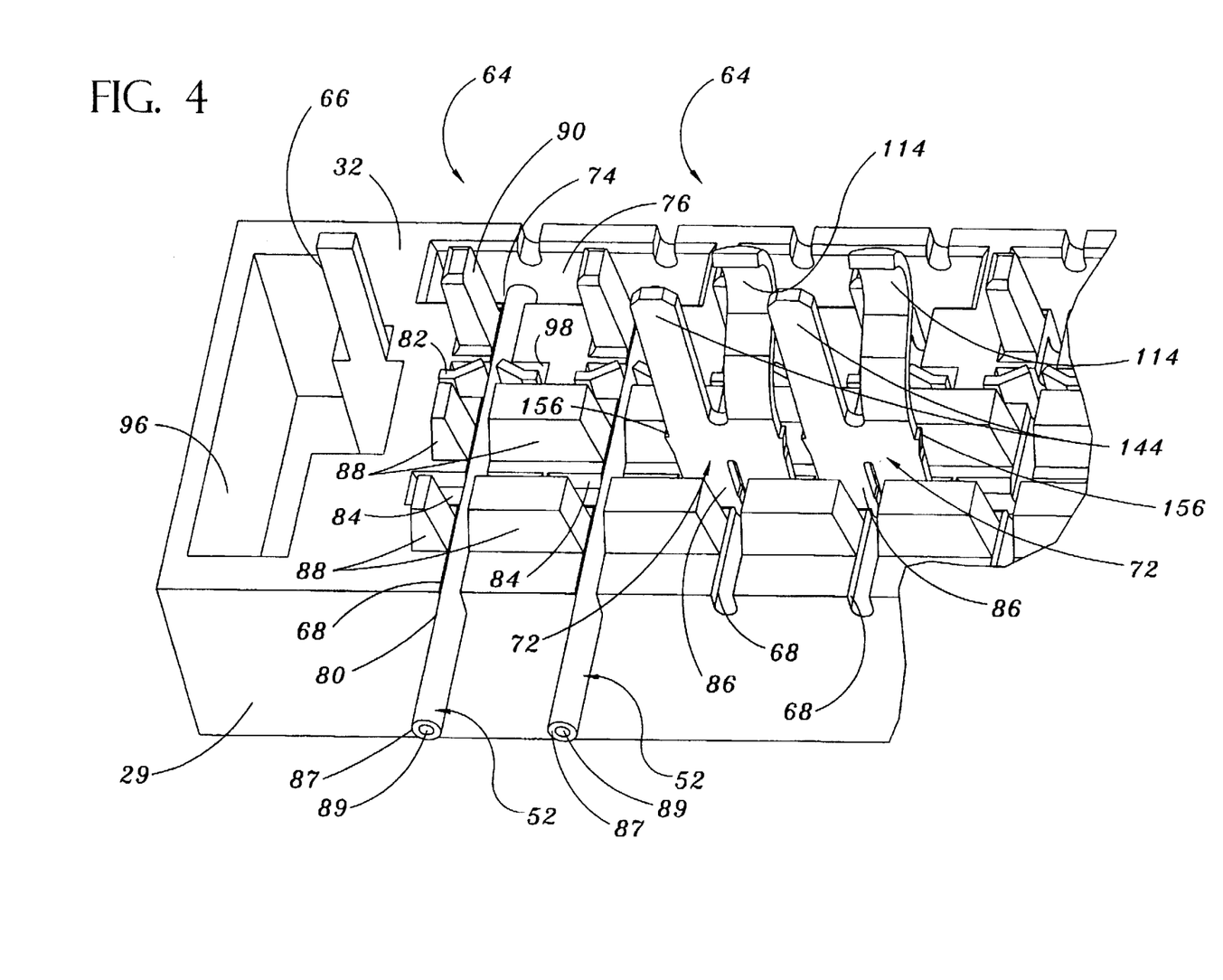
FIG. 4 is an enlarged, partial fragmentary, perspective view of a portion of the base module showing telephone company distribution lines positioned in receiving channels for engagement with connectors upon attachment of the connector module to the first side of the base module.
Figure 5:
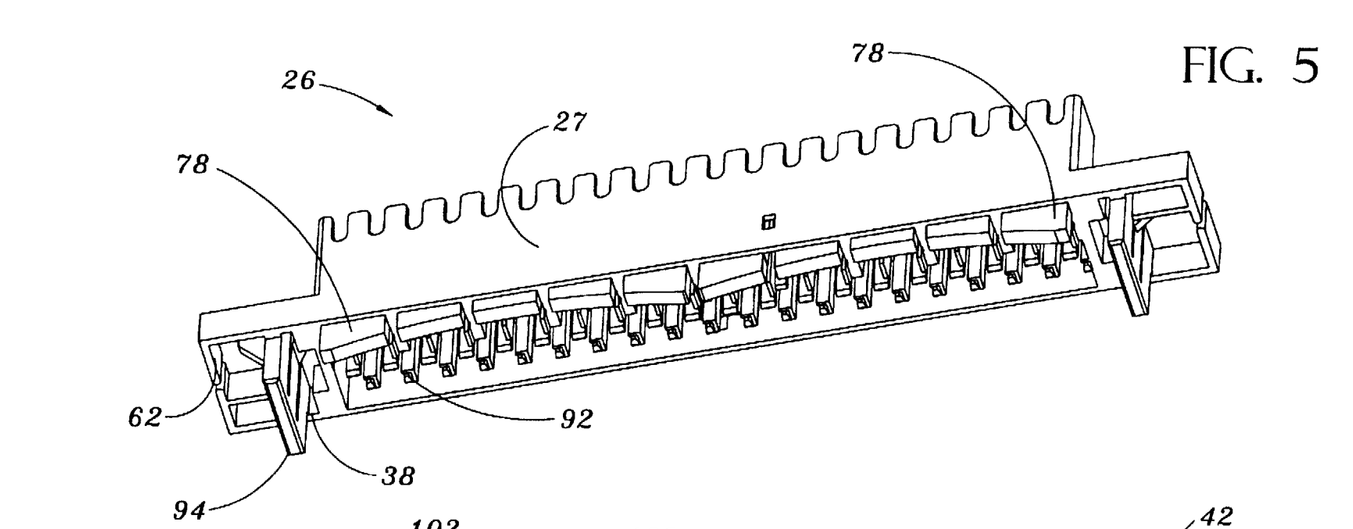
FIG. 5 is a perspective view of the bottom portion of the connector module showing a distribution line cutoff structure and frame mounting structures as well as wire engaging structures.

With reference to FIG. 4, the wire dressing structures 64 include a wire receiving channel 68 extending transversely through the first side 32 of the base module 28. FIG. 4 shows two distribution lines 52 placed in corresponding wire receiving channels 68 and two channels 68 in which distribution clips 72 are positioned transversely to the channels 68 for engaging a wire placed therein. It should be noted that wires have not been included in the channels over which the distribution clip 72 have been positioned in the interest of clarity.

Positioned at a terminal end 74 of the channel 68 is a well 76. The well 76 receives a trimming structure 78 formed on an abutting side of the connector module 26 (see FIG. 5). An opposite end of the channel 68 is an entry end 80. Spaced between the entry end 80 and the terminal end 74 is a strain relief structure 82 and a clip receiving well 84. As can be seen in FIG. 4, the distribution clips 72 have insulation displacement fingers 86 (hereinafter referred to as "IDC fingers 86") which straddle the channel 68 to displace insulation 87 surrounding the lines 52 and conductively engage a conductor 89 within the lines 52. The IDC fingers 86 are received in the clip receiving well 84.

Line positioning guide structures 88 are positioned on both sides of the channel 68 between the entry end 80 and the well 84 and the strain relief 82 in the well 84. The guide structures 88 quickly and efficiently guide a line 52 into the channel 68 with the strain relief structure 82 positively retaining the line 52 in the channel 68. The strain relief structures 82 are formed of a non-conductive material and are intended not to contact the conductor 89 within the line 52. The strain relief structures 82 also positively retains dressed lines in place as other lines are being dressed into the base module. The feature permits numerous lines to be dressed and then generally simultaneously connected. In the present invention 10 pairs of lined may be retained in the base module and generally simultaneously connected when the connector module is attached to the base module.

An alignment post 90 extends upwardly from the first side 32 to provide a positive positioning and alignment guide. The alignment post 90 engages an alignment groove 92 formed in the underside of the connector module 26. The combination of the trimming structure 78 engaging the well 76 for trimming the ends of the lines 52 and the post 90 engaging the groove 92 as well as end tabs 94 engaging end apertures 96 provides positive alignment of the connector module 26 with the base module 28. These positive positioning structures provide efficient and reliable connection between these modules 26, 28.

The trimming structures 76 are formed with varying degrees of extension from the underside of the connector module 26 so as to sequentially trim the lines as the modules 26, 28 are assembled. The incremental trimming of the lines reduces the forces that are required such that only a portion of the total number of line 52 are trimmed as the modules 26, 28 are engaged. This trimming arrangement helps reduce the trimming forces required thereby making it easier for the tradesperson to assemble the modular assembly system and to prevent assembly errors. The asymmetry of abutting portions of the connector module 26 and the base module 28 require that the modules 26,28 be in proper alignment for assembly thereby preventing any chance of assembling the modules 26, 28 in an incorrect position.

It should also be noted, that the present invention provides a high degree of environmental protection for the distribution line 52 retained in the base module 28 and connected to the connector module 26. Environmental protection is provided by means of a suitable gel, grease or other non-conductive environmentally protecting material of known composition. Preferably a non-conductive material referred to as "grease" is used with present invention. Grease is used because it is less expensive, easier to use during the manufacturing process and readily available and easy to use in the field for maintenance or repairs.

The environmental protection material is not illustrated in the figures in the interest of clarity. In use, the material is positioned in the well 76, the clip receiving well 84, and the cavity 100 of the connector module 26 and a cavity 101 of the half-tap assembly 60. These wells or cavities 76, 84, 100, 101 are the areas in which the conductive components of the lines 52, 54, 58 will be exposed or might be exposed. By providing a non-conductive environmental protection material in these areas, the lines 52 are protected against the detrimental environmental effects such as moisture and particulates and the resulting corrosion.

Figure 6:
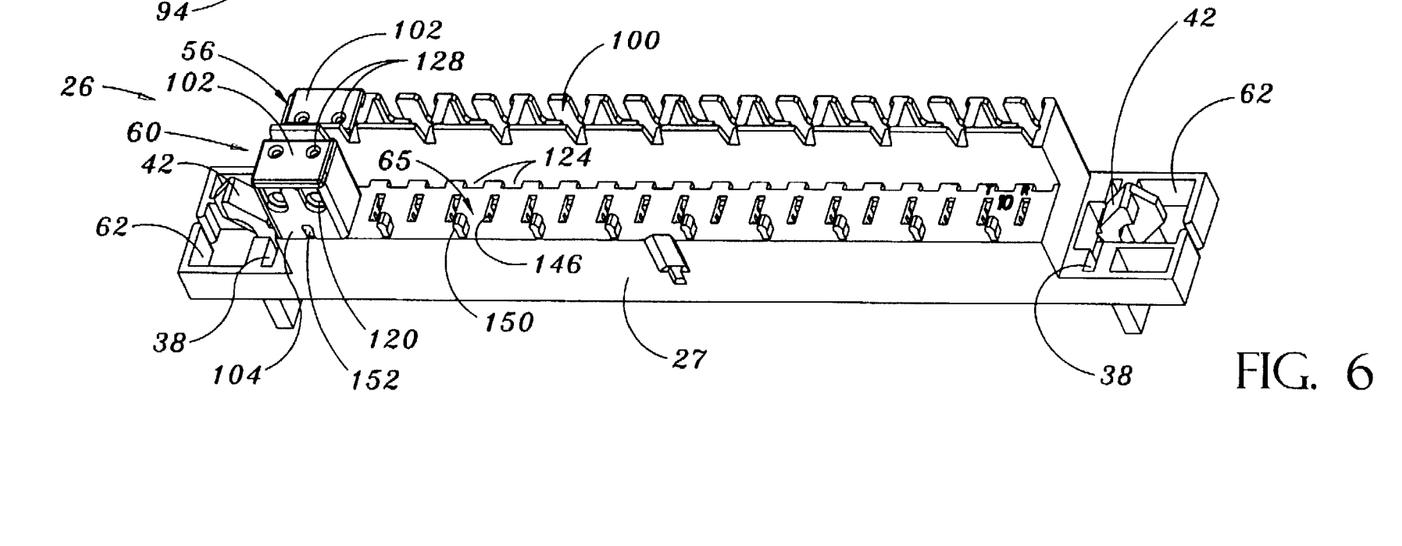
FIG. 6 is a perspective view of the top portion of the connector module showing an actuator positioned in a connection cavity and a half-tap assembly attached to a half-tap area of the connector module.

Turning now to a more detailed discussion of the connector module 26, the assemblies attached thereto, and the interconnection with the base module 28 and protection module 30, further reference is made to FIGS. 6–17. FIG. 6 provides an enlarged, top, perspective view of the connector module 26. As shown, the connector module 26 includes the service connection assembly 56 and the half-tap assembly 60. The service connection assemblies 56 include a cavity 100 formed in the connector module 26 and an actuator 102 which slidably engages the cavity 100. The half-tap assembly 60 includes a half-tap housing 104 and an actuator 102. It should be noted that the same actuator 102 is used with the service connection assembly 56 and the half-tap assembly 60. The half-tap assembly 60 may be selectively attached to the connected module 26 as a second line, coupled to, but independent from, the service line. Similarly, the half-tap assembly 60 may be removed from the connector module 26 if the second line is no longer needed.

A plurality of connector assemblies 56 and half-tap assemblies 60 are positioned along the connector assembly 26 in an orientation which prevents the half-tap assembly 60 from interfering with the connector assembly 56. In other words, the half-tap assembly 56 is not carried on and does not obstruct access to the connector assembly 56. Positioning the half-tap assemblies 60 on the same side of the connector module as the connector assemblies 56 in a back-to-back orientation also reduces a height dimension 105 of the modular assembly relative to the mounting frame (see FIGS. 1 and 2). Further, the independent attachment of the half-tap assembly 60 to the connector module 26 in the half-tap area 65 prevents having to disturb both lines to carry out an operation on one of the lines.

In contrast, while some prior art devices may provide half-tap assemblies, these prior art half-tap assemblies interfere with or are directly connected to the primary service line. Also, some prior art devices may provide a half-tap assembly integral with the service line assemblies and thus do not allow for selective addition or removal of half-tap assemblies. The prior art devices do not provide the ease of access as does the present invention, nor do such prior art devices provide the selective modularity of the present invention.

Figure 7:
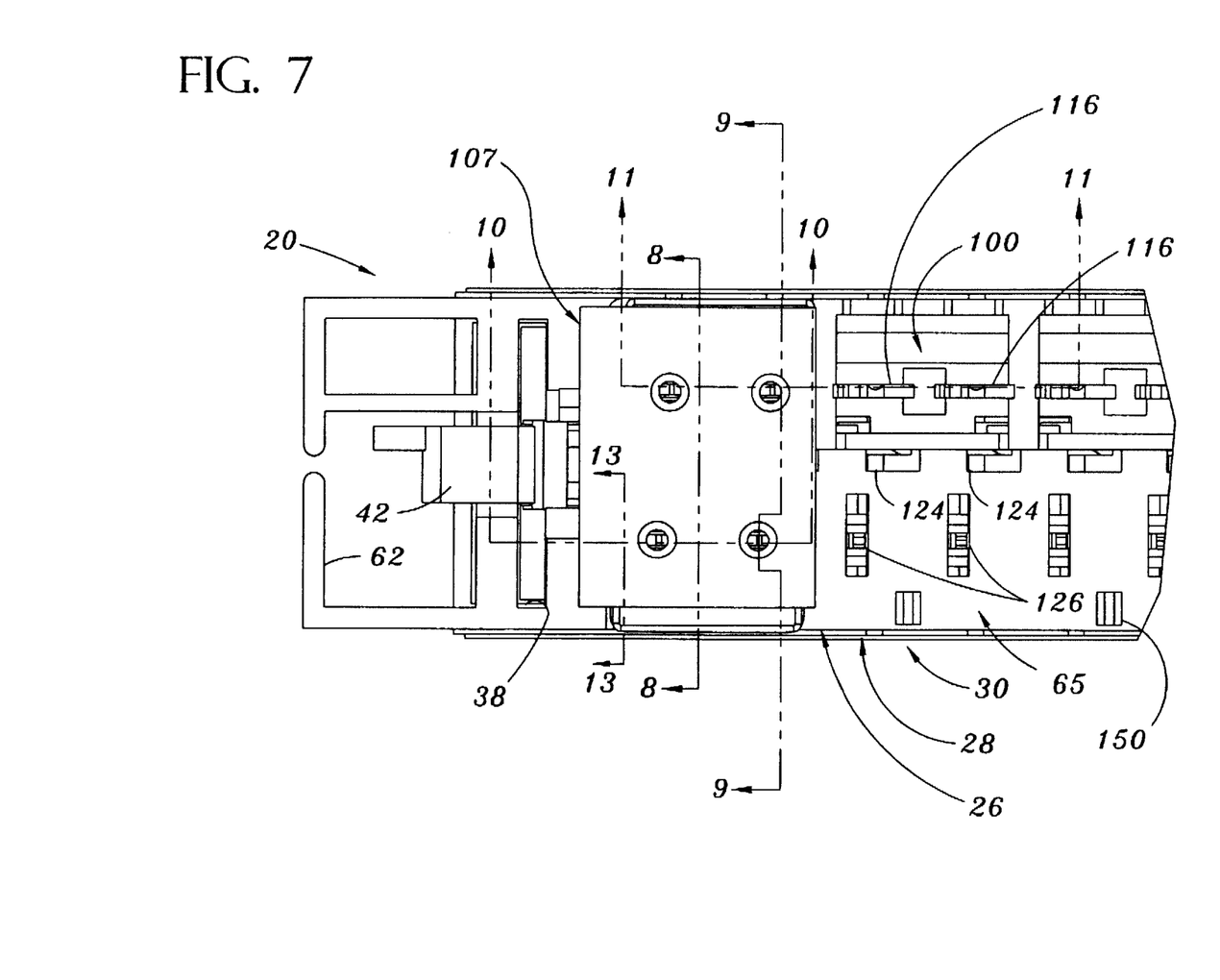
FIG. 7 is a partial fragmentary, top plan view of a portion of the connector module.
Figures 8, 9:
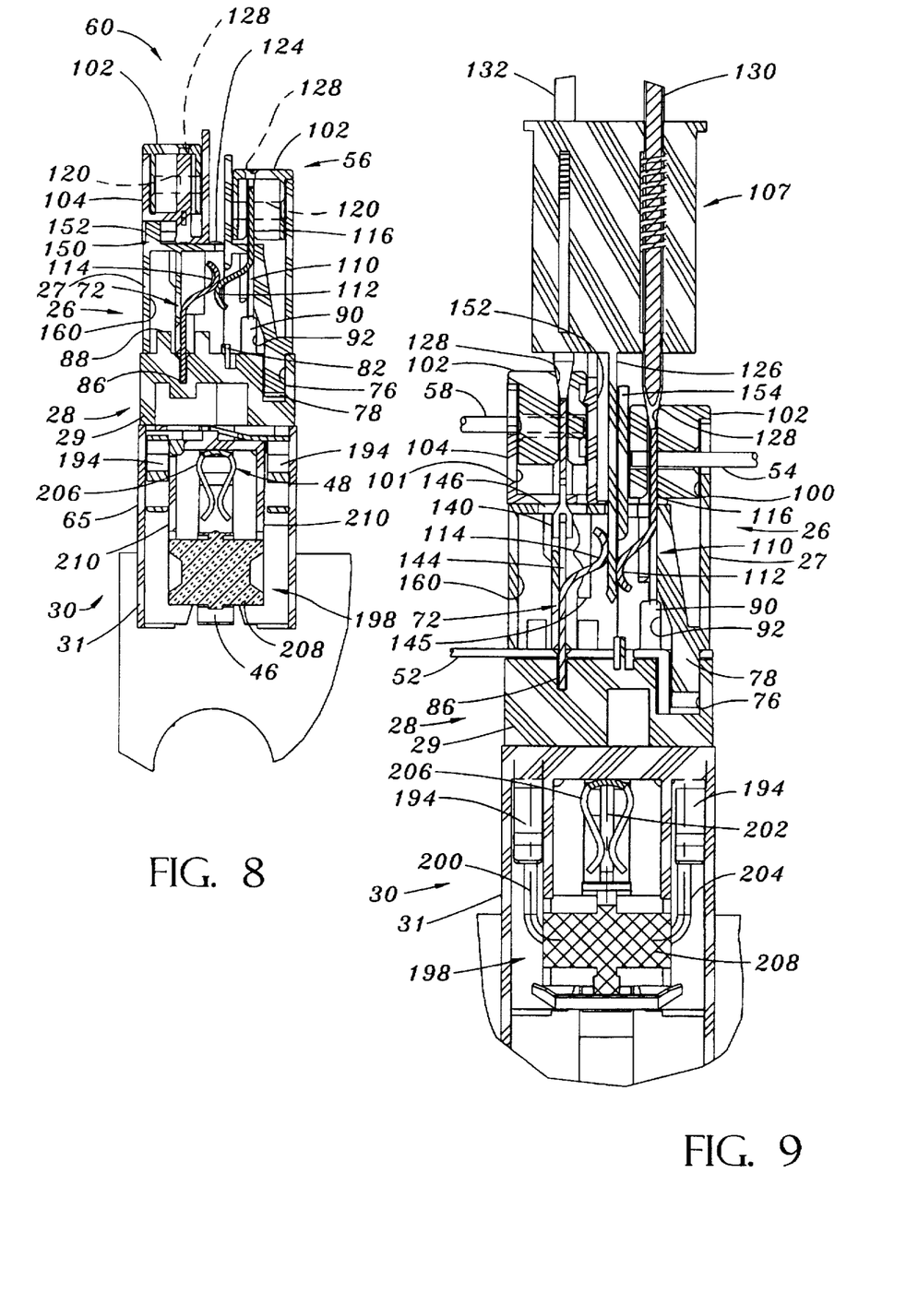
FIG. 8 is a partial fragmentary, cross-sectional, side elevational view taken along line 8—8 in FIG. 7 showing the connector module attached to a base module and a protection module attached to the base module to show the cross-sectional structure thereof.
FIG. 9 is a partial fragmentary, cross-sectional, side-elevational view taken along line 9—9 in FIG. 7.

FIG. 7 provides an enlarged, partial fragmentary, top plan view of the connector terminal block assembly system 20 as shown in FIG. 2. The cross sections therethrough provide additional details of the various structures and functions of the assembly system 20 of the present invention. A modular test probe assembly 107 is shown in FIGS. 7 and 9. The test probe assembly 107 has been removed from FIG. 8 in the interest of showing the assembly 20 without the test probe assembly 107.

Turning now to FIG. 8, the connector module 26 is shown attached to the base module 28, and the base module 28 is shown attached to the protection module 30. An electrical connection is made between the service connection assembly 56 and the distribution clip 72 by a service clip 110. The service clip 110 and the distribution clip 72 are retained in the connector module 26 for engagement with the lines retained on the base module 28.

An isolation leg 112, 114 is provided on both the service clip 110 and the distribution clip 72, respectively. Each of the clips 110, 72 have insulation displacement connector portions 116, 86 on ends opposite the isolation arms 112, 114. In fact, the present invention uses the same clip structure of the service clip 110 and the distribution clip 72. By using the same clip for each of the clips 110, 72 efficiencies are gained by reducing the number and type of parts, such as fewer individual types of parts to inventory, manufacture and track.

The isolation legs 112, 114 are curved spring biased components which are integrally formed with the respective clips 110, 72. The clips 110, 72 are oriented with the convex portions of the isolation legs 112, 114 in abutting contact. The clips 110, 72 are positioned to place the isolation legs 112, 114 to contact with a slight spring biasing action so that the spring biased structure of the isolation legs 112, 114 provides a secure conductive engagement of the service clip 110 and the distribution clip 72.

Figure 10:
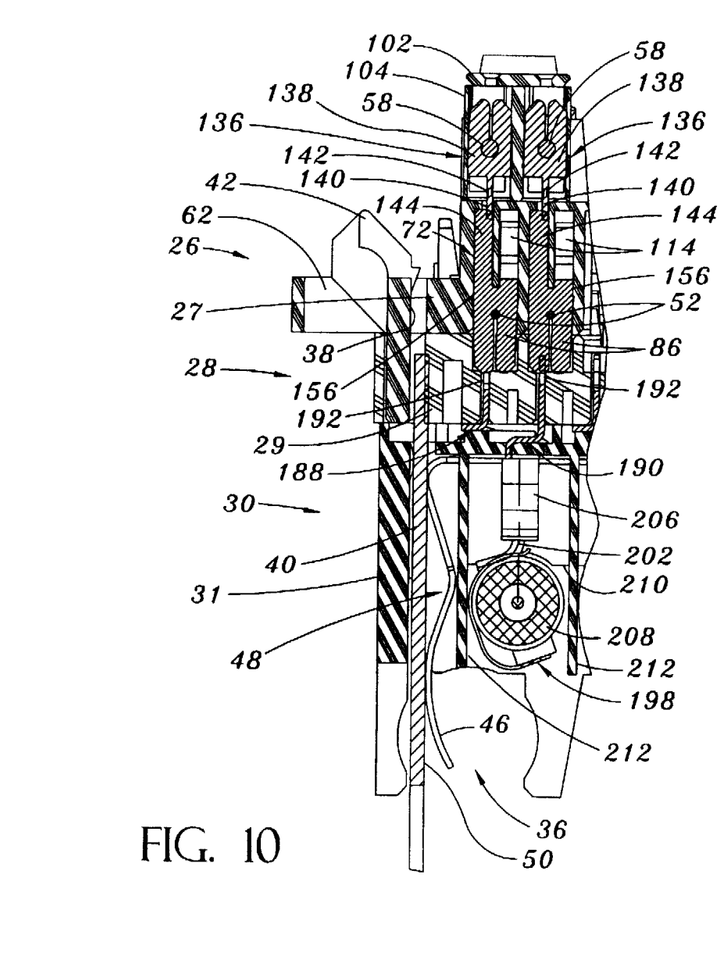
FIG. 10 is a partial fragmentary, cross-sectional, side elevational view taken longitudinally through a portion of the modular terminal block assembly as shown in FIG. 7—7.
Figure 11:
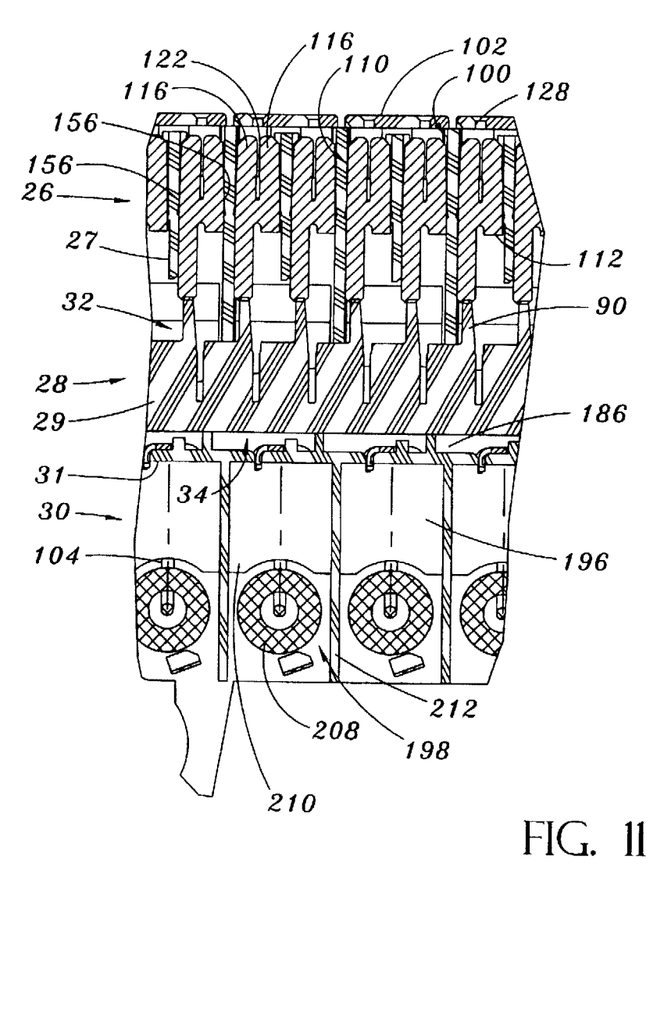
FIG. 11 is a partial fragmentary, cross-sectional, side elevational view taken along line 10—10 in FIG. 7.

Referring to FIGS. 3, 4, 10 and 11, it can be seen that all of the service and distribution clips 110, 72 are inserted into and retained in the connector module 26 from the same side. Distribution clips 72 shown on the base module 28 in FIG. 4 are provided only for illustrative purposes; these clips 72 are actually retained in the connector module 26. FIGS. 10 and 11 show barbs 156 on the clips 110, 72 which dig into the abutting surfaces of the connector module 26 to retain the clips 110, 72 therein. The IDCs 86, 116 are exposed to respective, opposite sides of the connector module 26 for attachment to respective lines. Same side assembly of the clips 110, 72 in the connector module 26 makes the connector module easier to assemble and easier to automate the assembly thereof, thus further increasing the efficiencies of the present invention.

An important feature of the present invention is that it can be assembled without the need for any special tools. In contrast, many prior art devices require the use of a specialized tool for the connection of lines to and assembly of terminal blocks. Prior art devices have profited from proprietary tools for terminal block assembly use. However, it is more advantageous to the tradesperson to not have to use specialized tools. For example, a tradesperson cannot carry out their assembly tasks if such a specialized tool is unavailable, damaged or lost. Additionally, such proprietary tools add additional expense to terminal block products.

In use, a service line is positioned in a bore 120 of the actuator 102 when the actuator is in an up position. In the up position, the actuator 102 is disengaged from the IDC portion 116 of the clip 110. The line is retained in the bore 120. The actuator 102 is moved downwardly to engage the line in the slot 122 forming a conductive connection between the clip 110 and the line. As described hereinabove, the IDC portion 86 of the distribution clip 72 is engaged with a line. As such, the distribution line is conductively coupled to the service line through the isolation legs 114, 112, respectively.

An isolation port 124 is positioned over the spring biased connection of the isolation legs 112, 114. As shown in FIG. 9, an isolation plug 126 may be inserted through the isolation port 26 to separate the isolation arms 112, 114. With the arms 112, 114 separated by the isolation plug 126, the distribution line is disconnected from the service line. Further, test ports 128 are provided on top of the actuators 122 to provide a conductive path to contact the IDCs 116 positioned in the actuator 102. As such, test probes 130, 132 may be inserted into the test ports 128 to test the lines. It should be noted that the plug 126 does not have to be part of a test probe assembly 107, but may be an independent component which may be used in the absence of the test probes 130, 132.

As noted above, the distribution clip 72 and the service clip 110 are identical clips oriented in different direction so that the isolation legs 112, 114 are in engagement. Efficiencies gained in the present invention by use of identical parts is extended by the use of identical actuators 102 for the service connector assemblies 56 and the half-tap assemblies 60. This similarity of parts helps reduce the number of specialized parts required for the present invention which decreases problems which may be associated with additional unique components.

Figure 12:
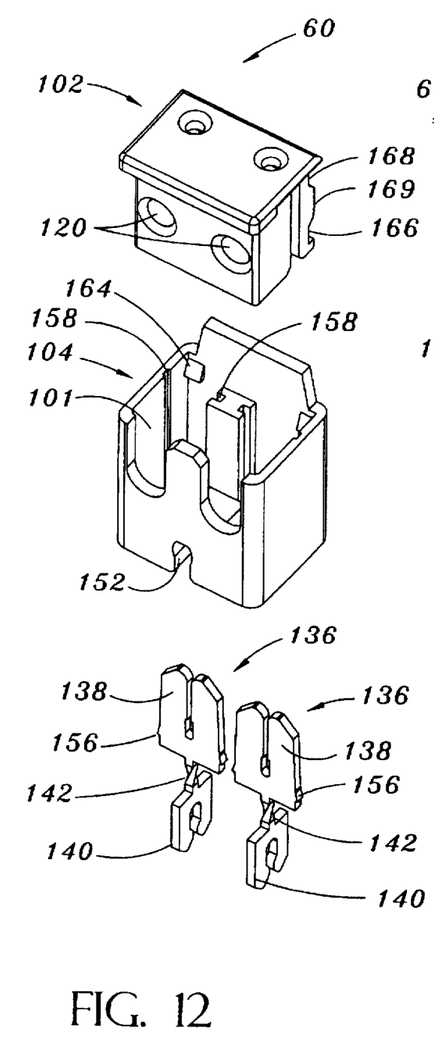
FIG. 12 is an enlarged, exploded, perspective view of a half-tap assembly such as those shown in the preceding figures attached to the half-tap area of the connector module.

With further reference to FIGS. 8, 9, and 12, it can seen that the half-tap assembly 60 includes the actuator 102, the housing 104 and a pair of half-tap clips 136. Each clip 136 includes an insulation displacement connector portion 138, a forked connector portion 140 and a shaft 142 therebetween. It should be noted that the clips 136 are typically stamped from a desired metallic material. In this regard, the half-tap clips 136 have a shaft 142 which is a twisted portion extending between the IDC portion 138 and the forked connector 140. This is desirable because this arrangement permits the half-tap clips 136 to be oriented in a direction which will allow engagement with the IDC 138 in the same orientation as the service connection assembly 56 while engaging a similarly aligned portion of the distribution clip 72.

As shown more clearly in FIGS. 9 and 10, the forked connector 140 engages an aligned leg 144 of the distribution clip 72. Line 9—9 in FIG. 7 is offset slightly through a small portion of the assembly 20 in order to show in FIG. 9 the forked connector 140 coupled to the top portion of an aligned leg 144 of the corresponding distribution clip 72. In FIG. 9 a portion of a wall 145 has been broken away to reveal the connection therebehind. In this manner, a half-tap assembly 60 can be connected to each of the distribution lines 52 to add a second line.

More particularly, the half-tap assembly 60 is connected to the connector module 26 by inserting the forked connector 140 through a corresponding access port 146 through the half-tap area 65 of the connector module 26. An upstanding pin 150 is also formed in this area for engaging a corresponding slot 152 formed in the half-tap housing 104. As shown in FIG. 9, a rear wall 152 of the connector housing 104 is spaced away from a rear wall 154 of the service line assembly 56 to allow access to the isolation port 124 therebetween. The access ports 146 act as test probe points if the half-tap connector assembly 60 is not connected to the connector module 26. However, if a half-tap assembly 60 is connected to the connector module 26, test access is provided by the test ports 128 formed through the actuator 102 of the half-tap assembly 60. The half-tap assembly 60 is easily attached or removed from the connector assembly in a pressed manner. The clips 136 are retained inside the housing 104 by means of barbs 156 formed on the outer perimeter of the clips 136. The clips 136 are inserted between slots 158 formed in the housing with the barbs 156 engaging the corresponding surface in the slots 158.

As such, the half-tap assembly 60 is provided as a single assembled component with captive elements thereof for attachment to and disengagement from the connector module 26. As will be described in greater detail hereinbelow, the actuator 102 is connected to the housing 104 and captively retained therein. Due to the modular nature of the half-tap assembly 60, the assemblies need only be attached when a second line is required and may be removed once a second line is no longer needed. This modular construction helps maintain only the connections that are needed and reduces the possibility for interconnection errors. Interconnection errors are reduced because the half-tap assembly 60 may be removed when no longer inserted thereby preventing an accidental connection thereto.

With further reference to FIGS. 9 and 10, it should be understood that the primary cavity 160 of the base module 28 and the connector cavities 100 of the connector module 26 may be filled with a non-conductive environmental protectant such as the "grease" in order to provide further environmental protection of the connections retained therein. Further, each of the actuators 102 employed in the service connection assemblies 56 and the half-tap assembly 60 may be provided with environmental protectant material in the bores 120 so as to provide a nonconductive environmental protectant around a connection between the lines and the corresponding IDC clips 116, 138, 86.

Figure 13:
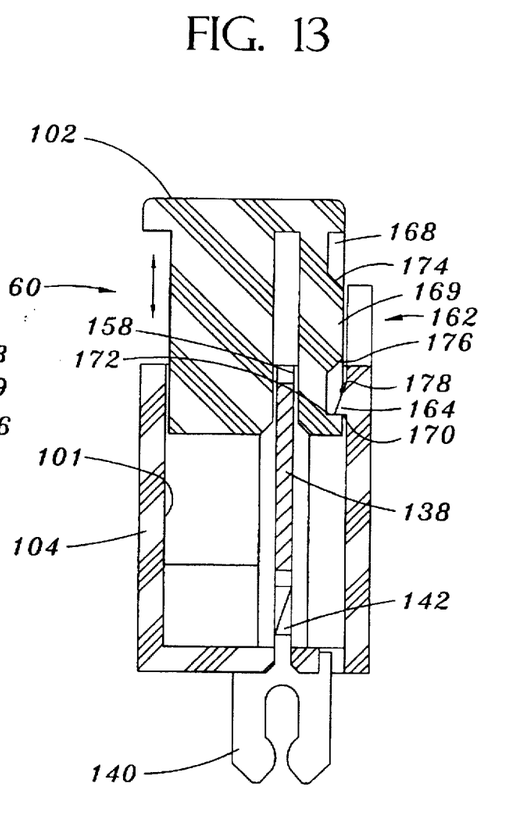
FIG. 13 is a partial fragmentary, cross-sectional, side elevational view of a half-tap assembly taken along line 13—13 in FIG. 7, and in which the actuator is in the raised positioned and showing retaining protrusions of the half-tap housing engaging a detent recess in the actuator.
Figure 14:
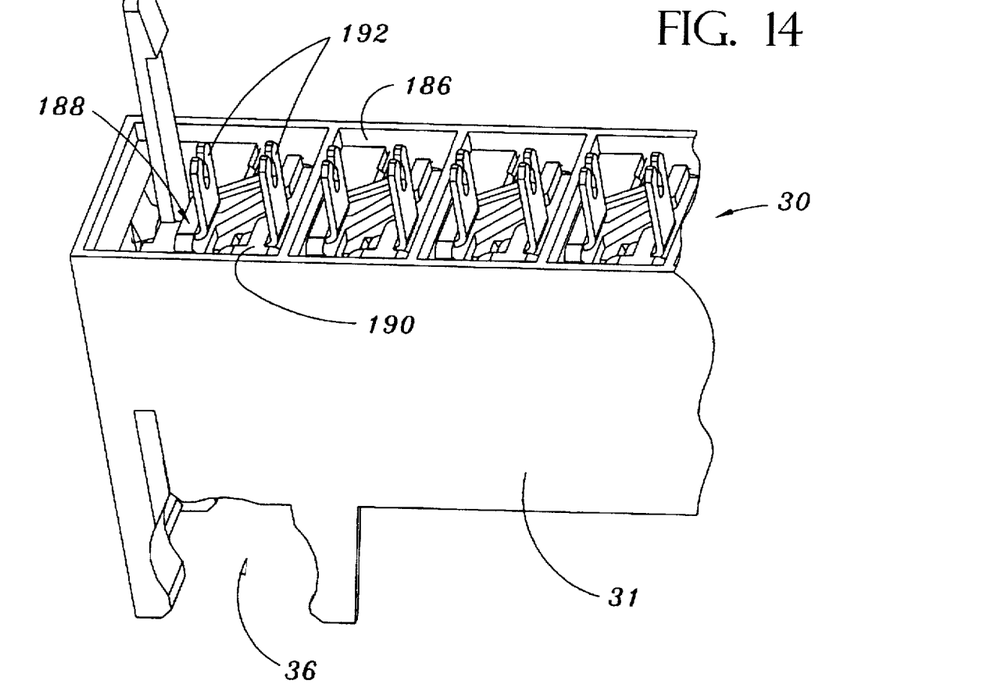
FIG. 14 is an enlarged, partial fragmentary, perspective view of the upper portion of the protection module as shown in FIG. 3 and in which ring clips and tip clips are retained in the module.

With reference to FIGS. 12 and 13, the actuator 102 is shown in FIG. 13 in the raised position. The actuator 102 can be forced downwardly into the housing to engage a line retained in a bore 120 to engage the line with the IDC clip 138. The service connector assembly 56 and the half-tap assembly 60 include captivating means 162. While the half-tap assembly 60 is shown in FIG. 13, it should be understood that the same captivating means 162 may be employed with the service connection assembly 56. The captivating means 162 includes a protrusion 164, a captivating notch 166 and a engaging notch 168 which are positioned along a rearside of the actuator 169. The protrusion 164 extends into the captivating notch 166 to captively retain the actuator 102 in the housing 104. It should be noted that the protrusion 164 has a generally perpendicular edge surface 170 which abuts a corresponding generally perpendicular surface 172 of the captivating notch 166. When the surfaces 170, 172 abut, the actuator 102 is prevented from being disengaged from the housing 104.

Both the engagement notch 168 and the captivating notch 166 have sloped surfaces 174, 176, respectively. The sloped surfaces 174, 176 allow the actuator 102 to travel upwardly and downwardly relative to the protrusion 164. In this regard, the protrusion 164 has a sloped surface 178 which allows the sloped surface 176 of the captivating notch 166 to ride thereover when the actuator 102 is moved downwardly. Similarly, once the actuator 102 is moved downwardly, the protrusion 164 engages the engagement notch 168. The generally perpendicular surface 170 on the protrusion 164 tends to resist disengagement of the protrusion 164 from the notch 168. However, when suitable force is applied to the actuator 102, it can be upwardly disengaged from the housing 104 with the sloped surface 174 riding against the generally perpendicular surface 170 thereby allowing the actuator 102 to move upwardly. As such, the engagement notch 168 allows the actuator 102 to be forcibly disengaged from the protrusion 164. Also, the captivating notch 166 positively retains the actuator and prevents the actuator 102 from being disengaged from the protrusion 164 once the actuator 102 is positioned in the housing 104.

With reference to FIGS. 11, 14, 15, 16 and 17, it can be seen that the present invention includes a protection module 30. The protection module 30 includes a protection module housing 31 from which depends the rod mounting structure 36 and which include a plurality of chambers 186. In each chamber is a ring clip 188 and a tip clip 190. The ring tip clip and the tip clip are also shown in FIG. 3 and include a forked connector 192 on one end of each clip 188, 190 and a gripper 194 formed on the opposite end of each clip 188, 190. The ring clip 188 and tip clip 190 are arranged so that the forked connectors 192 are axially aligned. This axial alignment allow the forked connectors 192 to engage corresponding arms of the distribution clip 72 IDC arms 86. The engagement of the forked connectors 192 of the ring clip 188 and tip clip 190 is more clearly illustrated in FIG. 10 which shows the forked connectors 192 engaging the arms 86 of the distribution clips 72.

Figure 15:
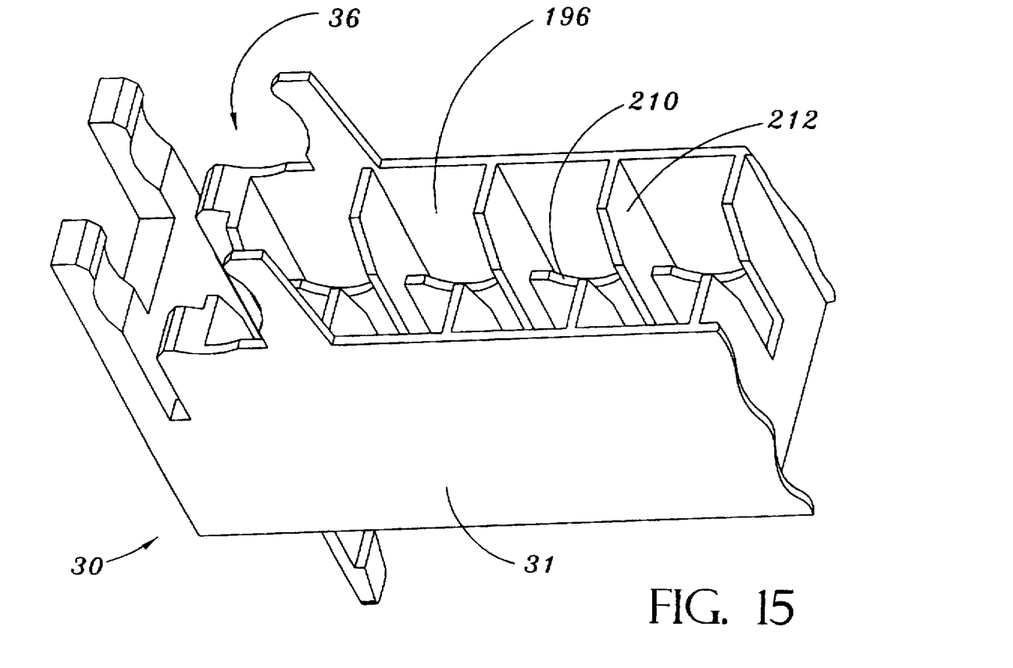
FIG. 15 is an enlarged, partial fragmentary, perspective view of a bottom portion of the protection module housing showing the frame cavity, rod mounting structure and protection module compartments in the underside of the housing in which the protection modules have been removed.

With further reference to FIG. 15, a partial fragmentary, perspective view of the underside of the protector module housing 31. This partial fragmentary, underside view is shown in order to illustrate the single piece, unitary construction of the housing 31 including the rod mounting structures 36 on the ends thereof. This single piece construction is advantageous because it eliminates numerous pieces and sub-assemblies as found in some prior art devices. For example, the protection module 30 of the present invention has a single piece body for the housing 31. The single piece housing eliminates special, independent structures for mounting the module 30 to a rod frame system. Further, the housing 31 includes a plurality of compartments 196 for retaining individual protector devices 198 (as shown in FIG. 3) which eliminates special independent cartridges or cassettes for holding protection devices. Additional efficiencies are gained from the single piece construction of the protection module housing 31 because additional parts are eliminated and a single type of housing 31 can be used regardless of the mounting frame system.

It should be noted that the protector devices 198 as shown in FIG. 3 are three element gas tube type protector devices of a known construction. It is within the scope of the present invention to substitute two element protector devices, as well as solid state protectors in the protection module 30. These devices 198 are conductively coupled to the modular terminal block assembly system 20 of the present invention as set forth hereinabove. The protector devices 198 include three leads 200, 202, 204 which are engaged in corresponding grippers 194, 206, 194, respectively. It should be noted that the ground bar structure 48 includes a plurality of grippers 206 one each corresponding to a pair of ring clip and tip clip grippers 194. In other words, the lead 202 engages the ground bar gripper 206 and with the leads 200, 204 each, respectively, engaging a ring clip or tip clip gripper 194, 194. In FIG. 17, the cross-sectional view taken along line 17—17 in FIG. 16 shows the engagement of the leads 200, 202, 204 with the corresponding grippers 194, 206, 194, respectively.

Figure 16:
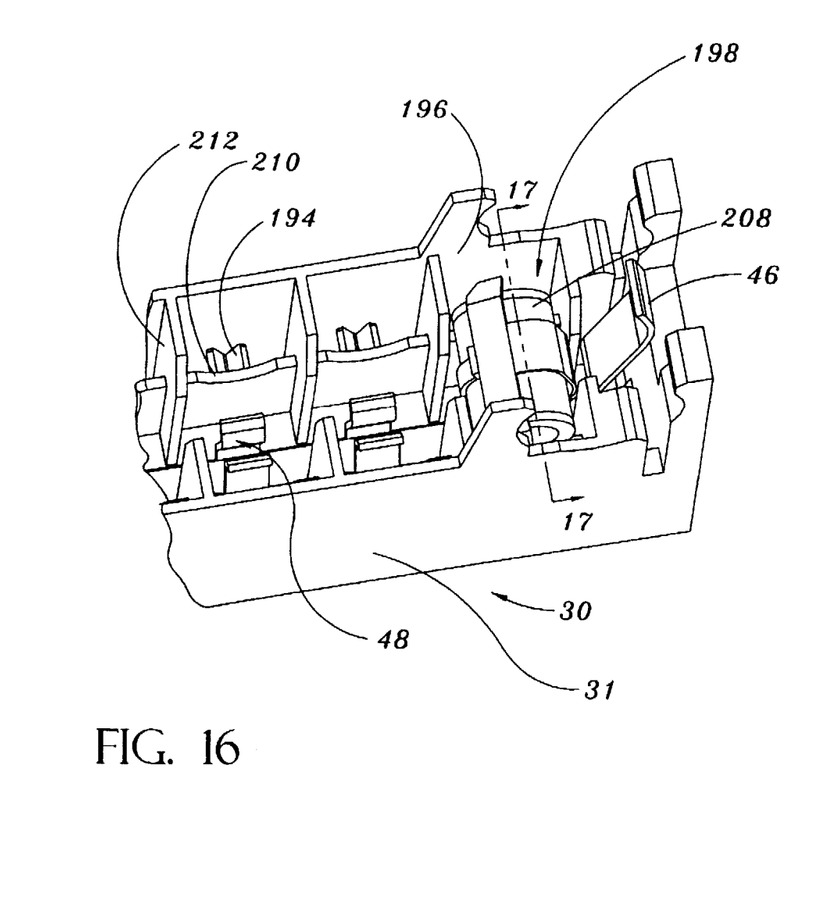
FIG. 16 is an enlarged, partial fragmentary, perspective view of the underside of the protection module housing similar to that as shown in FIG. 15 and in which a ground bar has been installed in a central channel, ring and tip clips have been installed with gripper portions extending into the protection module compartments, and a protection module installed in the protection module compartment.
Figure 17:
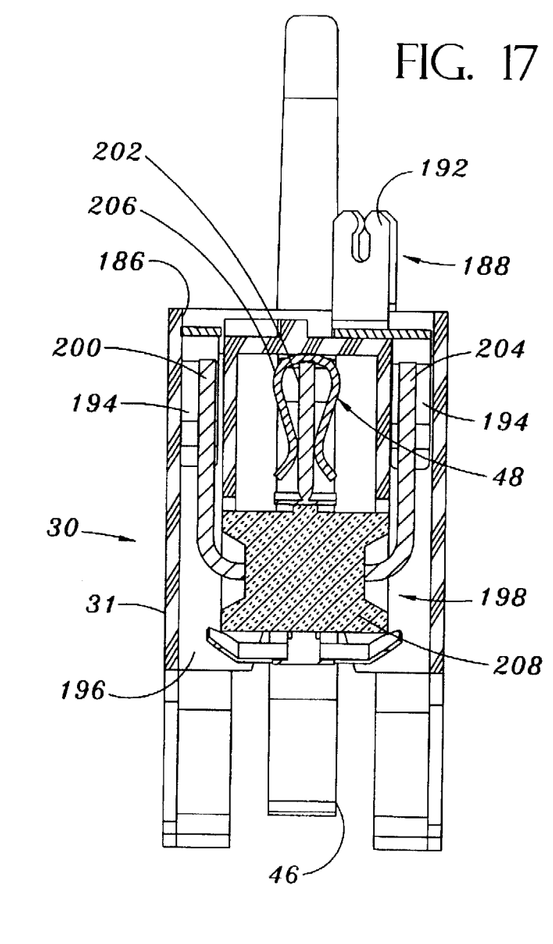
FIG. 17 is a partial fragmentary, cross-sectional, side elevational view taken along line 17—17 as shown in FIG. 16 showing the connection of the protection module to the ground bar and the gripper portions of the tip clip and ring clip attached to the protection module housing.

With reference to FIG. 16, a partial fragmentary portion of the protection module 30 is shown with the ring clip 188, tip clip 190, as indicated by the grippers 194, and the ground bar 48 in position. A body portion 208 of the protection device 198 is retained in a corresponding compartment 196 with the body positioned against a wall 210 dividing compartment 196 into several portions. The secondary walls 212 are positioned between each protection device 198 so as to segregate or isolate the protection devices 198 from one another.

As shown in FIGS. 1, 2, 3, and 10 the grounding bar structure 48 is constructed to be compatible with both the rod frame structure 22 and the u-shaped frame structure 24. The grounding bar 48 is a single piece component which is retained in the housing 31 having the biases portion 46 and the grippers 206 extending therefrom. The biased portion 46 biases against an outside surface 213 of the rod frame 22 or against the wall 50 of the u-shaped frame 24. In this manner, the biased portion maintains conductive contact with the conductive surface of the respective type of frame assembly. For example, if the assembly is attached to a U-shaped frame assembly, the biased portion 46 is forced inwardly by the dimensional difference of the spacing of the U-shaped frame mounting apertures and structures. The dimensional difference results in the biased portion 46 being biased outwardly against the wall 50. Alternatively, when the assembly 20 is attached to a rod by snap-fitting the rod mounting structures 36 over the corresponding rod, the biased portion is forced outwardly by the dimensional difference of the spacing of the rods and the rod mounting structures. The dimensional difference results in the biased portion 46 being biased inwardly against the rod surface 213.

There are several advantages of the present invention over the prior art with regard to the protection module 30. First, the protection module 30 of the present invention is positioned away from the connector module 26 to allow free access to the service connection assemblies 56 and the half-tap assemblies 60. In other words, connections may be made to and removed from the service connection assemblies 56 and any half-tap assemblies 60 while maintaining constant protection on the assembly 20. The present invention assures that tradespersons and equipment will be protected by the protection module 30 at all times.

Additionally, the present invention 20 is a modular design which allows the protection module 30 to be added after the distribution lines are connected to the base module 28 and the connector module 26. Further, the protection module 30 provides for removal of the protection devices 198 after a failure has occurred. This allows the fault to be corrected and a new protector 198 inserted into the corresponding compartment 196. The protection module 30 allows different types of protectors 198 to be inserted in order to retrofit an existing assembly 20 or other types of protection devices such as a solid state protection device 198.

While a preferred embodiment of the present invention is shown and described, it is envisioned that those skilled in the art may devise various modifications and equivalents without departing from the spirit and scope of the appended claims. The invention is not intended to be limited by the foregoing disclosure.

The invention claimed is:

1. A modular terminal block assembly comprising:

a base module for dressing and retaining distribution lines;

a connector module having distribution clips retained therein for engagement with said distribution lines retained in said base module, and service clips retained therein for connection of service lines thereto, said service clips and distribution clips being conductively coupled;

a protection module including protection clips retained therein coupled to said distribution clips retained in said connector module, protector devices conductively coupled to said protection clips for providing protection of said distribution and service line; and mounting structures for attaching said modular connector terminal block assembly to a conductive frame structure, at least a portion of said mounting structures being conductive and conductively coupled to said protector devices for conductively connecting said protector devices to said frame structure.

2. A modular terminal block assembly as recited in claim 1, further comprising:

said base module having a first side and a second side, said connector module being attached to said first side of said base module, said protection module being attached to said second side of said base module, said connector module and said base module retaining and conductively engaging distribution lines therebetween and said connection module having service connection assemblies attached thereto for conductively connecting said service lines to said distribution lines.

3. A modular terminal block assembly as recited in claim 2, further comprising:

protection clips retained in said protection module having grippers thereon for engaging protector devices mounted to said protection module, said grippers being conductively coupled to said distribution clips, said grippers being positioned generally facing away from said second side of said base module for engaging a protector device in a position spaced away from said service connection assemblies to allow access to said service connection assemblies while maintaining line protection in said modular terminal block assembly.

4. A modular terminal block assembly as recited in claim 1, further comprising:

an isolation leg connected to each of said service clip and said distribution clip, said isolation leg providing a biased structure; and isolation ports formed in said connector module proximate to said isolation legs of said service clip and said distribution clip, said isolation ports being positioned for receiving a non-conductive body therethrough for positioning between said isolation legs of said service clip and said distribution clip to open the conductive connection formed thereby.

5. A modular terminal block assembly as recited in claim 1, said base module further comprising:

a plurality of line dressing structures on a side of said base module positioned for abutting and engaging said connector module.

6. A modular terminal block assembly as recited in claim 5, said base module further comprising:

said line dressing structures including a line receiving channel for orienting a line therein and a strain relief structure positioned proximate to said line receiving channel for retaining a portion of a line positioned in said line receiving channel.

7. A modular terminal block assembly as recited in claim 6, further comprising:

a connection well formed in said base module proximate to said line receiving channel for receiving a portion of said distribution clip therein to connect a line positioned in said line receiving channel extending over said connection well with said distribution clip.

8. A modular terminal block assembly as recited in claim 7, further comprising:

a non-conductive material being disposed in said connection well to environmentally protect a connection made in a line placed in said line receiving channel with said distribution clip.

9. A modular terminal block assembly as recited in claim 6, further comprising:

said line receiving channel having an entry end, and a terminal end, said strain relief structure being positioned between said entry end and said terminal end.

10. A modular terminal block assembly as recited in claim 9, further comprising:

a connection well positioned proximate to said line receiving channel between said entry end and said terminal end for receiving a portion of a distribution clip therein for connection to a line retained in said line receiving channel, said strain relief structure being positioned between said connection well and said terminal end of said line receiving channel.

11. A modular terminal block assembly as recited in claim 9, further comprising:

a line trimming structure on said connector module and a trimming cavity positioned in said base module proximate to said terminal end of said line receiving channel, said line trimming structure being positioned on said connector module for engagement in said trimming cavity for trimming a terminal end of a line retained in said line receiving channel when attaching said connector module to said base module.

12. A modular terminal block assembly as recited in claim 11, further comprising:

each of said trimming cavities having a non-conductive material retained therein for environmentally protecting a trimmed portion of a line retained in said line receiving cavity.

13. A modular terminal block assembly as recited in claim 1, further comprising:

at least one half-tap assembly attached to said connector module proximate to a corresponding one of said service connection assemblies; and said half-tap assembly including half-tap clips conductively connected to corresponding ones of said distribution clips retained in said connector module for providing a second line connection associated with a corresponding service connection assembly.

14. A modular terminal block assembly as recited in claim 1, wherein said connector module includes a connector module housing, said base module includes a base module housing, and said protection module includes a protection module housing.

15. A modular terminal block assembly as recited in claim 14, wherein each of said connector module housing, and said base module housing, and said protection module housing are individually, integrally formed as a single piece, unitary body.

16. A modular terminal block assembly as recited in claim 15, further comprising:

said base module housing having locking fingers formed on a first side thereof for engagement with an abutting portion of said connector module, and said protection module housing include locking fingers for connection with said base module housing.

17. A modular terminal block assembly as recited in claim 14, wherein said protection module includes a protection module housing, rod mounting structures being attached to a side of said protection module housing spaced away from said base module.

18. A modular connector terminal block assembly system as recited in claim 1, further comprising:

said connector terminal block assembly receiving ten pairs of distribution lines on said base module and said connector module providing service connection assembly for ten pairs of service connection lines.

19. A protection module assembly for use with a terminal block assembly said protection module comprising:

a protection module housing;

a grounding structure coupled to said protection module housing, said grounding structure being a single piece, unitary structure providing biased grounding contact with a corresponding surface of one of a U-shaped frame mounting system and a rod mounting system to which said modular terminal block assembly is attached;

attachment structures connected to said protection module housing for attaching said protection module assembly to said terminal block assembly;

protection clips retained in said protection module housing for conductively connecting said protection module to said terminal block assembly;

protector devices conductively coupled to said protection clips and to said grounding structure for providing electrical protection of said terminal block assembly attached thereto.

20. A protection module assembly as recited in claim 19, further comprising:

rod mounting structures attached to said protection module housing for attaching said protection module and said terminal block assembly attached thereto a rod frame system.

21. A protection module assembly as recited in claim 19, further comprising:

said protection clips including grippers for gripping a portion of said protector devices, said ground bar including grippers for gripping a portion of said protector devices.

22. A protection module assembly as recited in claim 21, said grippers being configured for receiving protector devices of the group consisting essentially of three-element gas tube protector devices; two-element gas tube protector devices; and solid state protector devices.

23. A terminal block assembly for connecting a distribution line to a service line, said terminal block assembly including a connector module including service connection assemblies, said service connection assemblies comprising:

a connection cavity;

a connection actuator sized and dimensioned for engagement in the connection cavity;

conductive service clips positioned in the connection cavity for receiving and terminating a conductive line by movement of said connector actuator in said connector cavity; and means for captivating said actuator in said cavity, said captivating means including retaining recesses and a protrusion, said captivating means including a captivating notch and an engagement notch formed on said actuator and said protrusion formed on an inside surface of said connection cavity for selectively engaging said engagement notch and said captivating notch, said protrusion and said captivating notch being shaped for positively retaining said actuator in said connection cavity, said engagement notch and said captivating notch being shaped for allowing movement of said actuator relative to said connection cavity, whereby said protrusion holds said actuator in said connection cavity when engaged with said captivating notch and releasably retains said actuator in an engaged position when engaged with said engagement notch.

24. A terminal block assembly for connecting a distribution line to a service line, said terminal block assembly including a connector module including service connection assemblies, said service connection assemblies comprising:

a connection cavity;

a connection actuator sized and dimensioned for engagement in the connection cavity;

conductive service clips positioned in the connection cavity for receiving and terminating a conductive line by movement of said connector actuator in said connector cavity; and means for captivating said actuator in said cavity, said captivating means including retaining recesses and a protrusion; and at least one half-tap assembly connected to said connector module, said half-tap assembly including a housing defining a connector cavity and a connection actuator engageable with said connector cavity of said half-tap housing, half-tap clips being retained in said half-tap housing for engagement with conductive elements of said connector module.

25. A terminal block assembly as recited in claim 24, said half-tap assembly, further comprising:

means for captivating said actuator in said cavity, said captivating means including retaining recesses and a protrusion, said captivating means having a captivating notch and an engagement notch formed on said actuator and said protrusion formed on an inside surface of said connection cavity for selectively engaging said engagement notch and said captivating notch, said protrusion and said captivating notch being shaped for positively retaining said actuator in said connection cavity, said engagement notch and said captivating notch being shaped for allowing movement of said actuator relative to said connection cavity, whereby said protrusion holds said actuator in said connection cavity when engaged with said captivating notch and releasably retains said actuator in an engaged position when engaged with said engagement notch.

26. A terminal block assembly for connecting a distribution line to a service line, said terminal block assembly including a connector module including service connection assemblies, said service connection assemblies comprising:

a connection cavity;

a connection actuator sized and dimensioned for engagement in the connection cavity;

conductive service clips positioned in the connection cavity for receiving and terminating a conductive line by movement of said connector actuator in said connector cavity; and means for captivating said actuator in said cavity, said captivating means including retaining recesses and a protrusion;

isolation ports formed in said connector module positioned relative to conductive elements of said connector module;

an isolation plug for selective engagement in said isolation port, said isolation plug being formed of a nonconductive material and being sized and dimensioned for insertion between conductive elements of said connector module to isolate a service line connected to said service connection assembly and a distribution line.

* * * * *